Dec. 8, 1936. N. B. GREEN 2,063,310
ERECTING MECHANISM FOR FOLDING CAMERAS
Filed Sept. 11, 1935
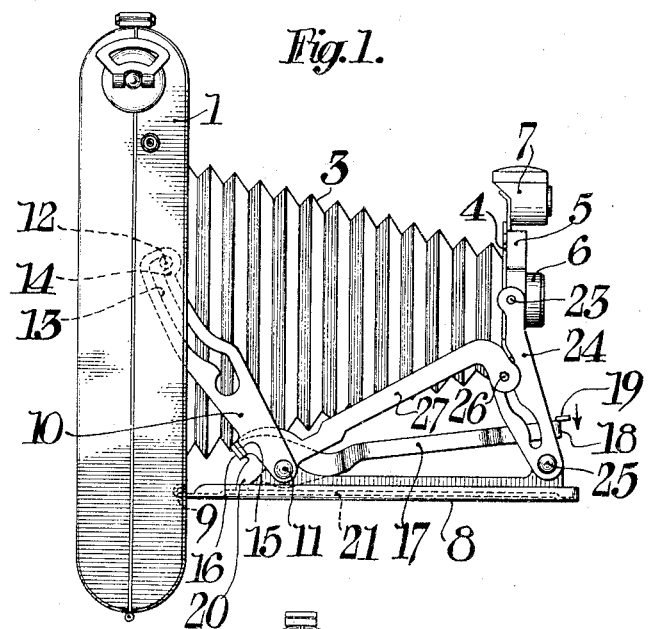
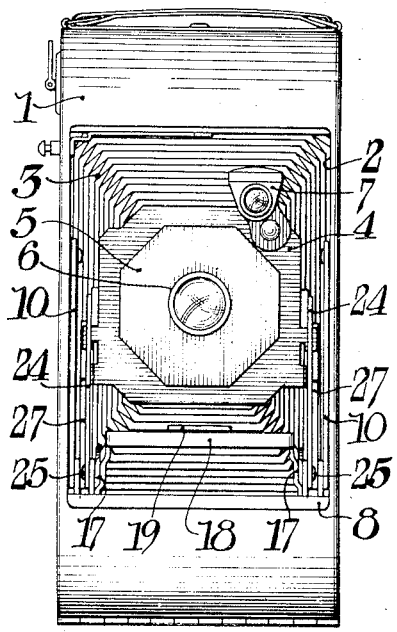
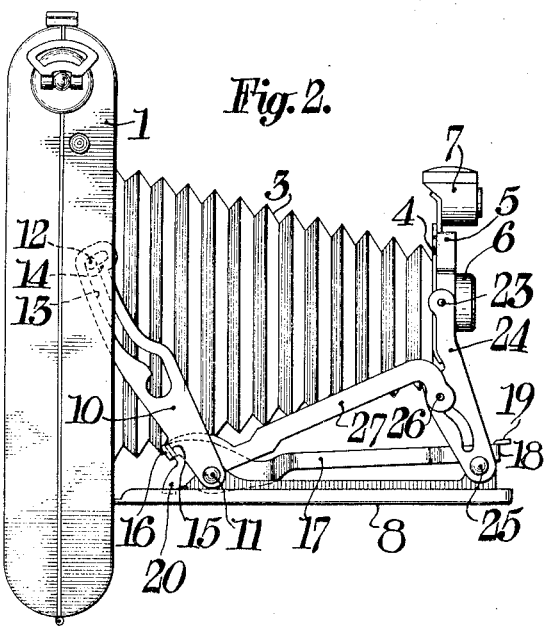
INVENTOR:
Newton B. Green,
BY
ATTORNEYS.

Patented Dec. 8, 1936

2,063,310

UNITED STATES PATENT OFFICE 2,063,310

ERECTING MECHANISM FOR FOLDING CAMERAS

Newton B. Green, Rochester, N. Y., assignor, by mesne assignments, to Eastman Kodak Company, Jersey City, N. J., a corporation of New Jersey Application September 11, 1935, Serial No. 40,119

7 Claims. (Cl. 95—40)

This invention relates to photography and, more particularly to photographic cameras. One object of my invention is to provide a camera of the type using a hinged bed supported by bed braces with a novel type of release permitting the bed braces to slide relative to the camera body so that the bed may move toward a closed position. Another object of my invention is to provide a bed brace releasing mechanism carried by the camera bed. Still another object of my invention is to provide a pair of camera braces mounted on a camera bed and to mount on the camera bed a mechanism for simultaneously releasing the bed braces to permit the camera to fold. Another object of my invention is to provide a self erecting front camera in which the camera shutter and lens are projected to a picture-taking position when the camera bed is moved to an operative or open position and to provide a means on the bed for causing the erecting mechanism to collapse by pressure upon a releasing lever carried by the bed and other objects will appear from the following specification, the novel features being particularly pointed out in the claims at the end thereof.

This present application relates to cameras of the type shown in Patent No. 1,435,646, Kroedel, granted November 14, 1922, for folding cameras. The present invention is particularly directed to an improved means of collapsing the mechanism shown in the Kroedel patent.

Coming now to the drawing wherein like references denote like parts throughout,

Fig. 1 is a side elevation of a camera including an improved bed brace releasing means constructed in accordance with a preferred form of my invention, Fig. 2 is a similar view but of the releasing means depressed so that the camera parts are in position for folding, Fig. 3 is a front elevation of the camera shown in Fig. 1.

In accordance with a preferred embodiment of my invention, the camera may consist of a camera body 1 having an opening in the front 2 for supporting the rear end of a bellows 3, the front end of which may be attached to a lens board 4. The lens board may support a shutter 5 and an objective, the front element of which may be carried in a lens cell 6. A finder 7 may be also carried by the lens board.

The camera is provided with a bed 8 which is hingedly attached at 9 to the camera body and which may be swung upon this hinge to open and close the camera.

In order to hold the camera bed erect in its operative open position shown in Fig. 1, I provide a pair of similar bed braces 10, one on each side of the camera bed. Each brace is pivoted to the stud 11 so that the braces 10 are pivotally attached to the lens board 8 and there is a pin 12 and slot 13 connection between the bed braces 10 and the camera body. At the end of the slot 13 there is a hook-like projection 14 which forms with the pin 12 a latch which is adapted to hold the camera bed in an erect or open position.

The bed braces 10 are provided with lugs 15 spaced from the pivots 11 and these lugs may be engaged by a similar pair of lugs 16 carried on the ends of arms 17 which are preferably joined together by a cross bar 18 which may carry the finger release 19. The arms 17 and the connecting bar 18 form a yoke, this yoke being pivotally mounted upon the studs 11 which also pivotally support the bed braces 10.

The arms 17 of the yoke are provided with downwardly extending end members 20 which are adapted to strike the bottom wall 21 of the camera bed 8, thus limiting the possible upward movement of the yoke.

When the finger grip 19 is pressed downwardly in the direction shown by the arrow in Fig. 1, the lugs 16 press upon the portions 15 of the bed braces 10 causing them to turn about their pivots 11 and causing the hook-like portions 14 of the slots 13 to become disengaged from the pins 12 moving the bed braces 10 from the position shown in Fig. 1 to the position shown in Fig. 2. When in this unlatched position, the camera bed may be swung upon the hinge 9 permitting the bed to fold against the camera body.

If the camera is of the type in which the front is automatically erected the lens board 4 may be pivotally attached at 23 to arms 24 which are in turn pivotally attached by the pivots 25 to the lens board 8. The arms 24 are slotted to receive studs 26 of the braces 27, these braces being also pivoted upon the studs 11. The braces 27, as explained in the above mentioned Kroedel patent, project the front into a picture-taking position when the camera bed is opened. However, in the Kroedel patent the camera construction is such that the braces must be released by pressing on each side of the camera shutter upon finger grips upon the ends of the braces and with my improved form of releasing mechanism this is unnecessary, since the finger piece 19 may be depressed enabling the yoke to simultaneously release both bed braces permitting the camera bed to fold.

It is quite obvious that my invention may be employed and it is preferably used on a self erecting front type of camera shown. However, it is equally obvious that the camera may be of the usual type in which the front must be manually drawn out upon the bed to position the camera for taking pictures. In either case, the bed braces may be simultaneously released for folding the camera by depressing a finger grip on a yoke engaging the bed braces.

What I claim is:—

1. In a folding camera, the combination with a camera body, of a bed hinged to the camera body, braces pivotally attached to the bed and having a pin and slot connection with the camera body including a latch to hold the camera bed open, a yoke mounted on the camera bed and adapted to engage the braces for releasing the latch whereby the bed may be folded upon its hinge.

2. In a folding camera, the combination with a camera body, of a bed hinged thereto, braces pivoted to the bed and having a pin and slot connection with the camera body, hooks at one end of the slots adapted to engage said pins to hold the body and bed in a fixed relation, and means for disengaging said hooks comprising a yoke movably mounted on the bed and having a portion adapted to engage said braces near their pivoted connection with the bed whereby pressure on the yoke may release said hooks permitting said bed to close.

3. In a folding camera, the combination with a camera body, of a bed hinged thereto, braces connecting the bed and camera, pivotal supports for the braces carried by the bed, a pin and slot connection between each brace and the camera body including hooks in the ends of the slots adapted to engage said pins for holding the bed open, means for releasing said hooks from said pins including a yoke having arms pivoted upon the pivotal supports for the braces, said arms being adapted to engage said braces near their pivotal supports, whereby pressure applied to said yoke may release said braces for holding the bed upon its hinge.

4. In a folding camera, the combination with a camera body, of a bed hinged thereto, braces connecting the bed and camera, pivotal supports for the braces carried by the bed, a pin and slot connection between each brace and the camera body including hooks in the ends of the slots adapted to engage said pins for holding the bed open, means for releasing said hooks from said pins including a yoke having arms pivoted upon the pivotal supports for the braces and extending to a point near that end of the bed which is spaced from the hinge, said arms being adapted to engage said braces near their pivotal supports, whereby pressure applied to said yoke near the end of the bed may release said braces for folding the bed upon its hinge.

5. In a folding camera, the combination with a camera body, of a bed hinged thereto, braces connecting the bed and camera, pivotal supports for the braces carried by the bed, a pin and slot connection between each brace and the camera body including hooks in the ends of the slots adapted to engage said pins for holding the bed open, means for releasing said hooks from said pins including a yoke having arms pivoted upon the pivotal supports for the braces, and extending over a portion of the bed, a center portion of the yoke extending transversely of the bed forming a release, said arms being adapted to engage said bed braces near their pivotal supports and being adapted to move them upon their pivotal supports when pressure is applied to said yoke release, whereby both bed braces may be simultaneously unhooked from the camera body permitting the bed to turn upon its hinge.

6. In a folding camera, the combination with a camera body, of a bed hinged thereto, means for supporting the bed comprising braces, pivotal mounts for the braces in the bed, a slidable latching connection between the braces and the body whereby the camera bed may be held in an operative position, a camera front carried by the bed including an objective, mechanism for erecting the camera front carried by the bed, and including a pair of actuating arms pivoted on the pivotal supports for the braces, and a yoke also pivoted on the pivotal supports for the braces and adapted to engage the bed braces to move them from an operative position whereby the camera bed and parts carried thereby may be folded.

7. In a folding camera, the combination with a camera body, of a bed hinged thereto, means for supporting the bed comprising braces, pivotal mounts for the braces on the bed, a slidable latching connection between the braces and the body whereby the camera bed may be held in an operative position, a camera front carried by the bed including an objective, mechanism for erecting the camera front carried by the bed, and including a pair of actuating arms pivoted on the pivotal supports for the braces, and a yoke also pivoted on the pivotal supports for the braces and adapted to engage the bed braces to move them from an operative position, said yoke extending from said pivotal support forwardly of the bed, a handle on the end of the yoke for manually moving the yoke to actuate the bed braces whereby the camera bed and associated parts may fold.

NEWTON B. GREEN.